United States Patent [19]

Moring et al.

[11] Patent Number: 4,545,452
[45] Date of Patent: Oct. 8, 1985

[54] AXLE HOUSING MOUNTING BRACKET

[75] Inventors: Rodger L. Moring, Bristol; Brent E. Rieke, Aurora, both of Ill.

[73] Assignee: Caterpillar Tractor Co., Peoria, Ill.

[21] Appl. No.: 535,526

[22] Filed: Sep. 26, 1983

[51] Int. Cl.[4] .............................................. B20B 35/00
[52] U.S. Cl. ........................................ 180/88; 29/150
[58] Field of Search .......................... 180/88; 29/150;
212/261; 228/165; 414/716, 727, 726; 219/137

[56] References Cited

U.S. PATENT DOCUMENTS

| 1,293,872 | 2/1919 | Murray | 219/137 R |
| 1,525,680 | 2/1925 | Crossman | 180/88 |
| 3,630,541 | 12/1971 | Carlson et al. | 280/124 |
| 3,993,155 | 11/1976 | Tkarhenko | 180/88 |
| 4,134,507 | 1/1979 | Piercy et al. | 414/727 |

Primary Examiner—Richard A. Bertsch
Attorney, Agent, or Firm—Joseph W. Keen

[57] ABSTRACT

A mounting bracket (14,14′) for attaching an axle housing (10) to a frame (16,16′) includes a rigid column structure (26,26′) attached to each of a front (22) and a rear side (24) of the axle housing (10) and having a longitudinal opening (30,30′), a plate (40,40′) arranged above and below the column structures and axle housing, and threaded fasteners (50,52) which extend through the upper plate (40,40′), lower plate (40,40′), and frame (16,16′). The plates (40,40′) are each attached only to the ends of the column structures (26,26′) while the column structures (26,26′) are attached to the front (22) and rear (24) sides of the axle housing (10) about a neutral axis (25). A continuous, endless weld joint (36,36′) is deposited in a closed loop figure which is laterally bounded by a wall (34,34′) of the column structure (26,26′) defining the longitudinal opening (30,30′) to join each column structure (26,26′) to the adjacent axle housing side (22,24). Bolts (50) extending vertically through the top and bottom plates, the column structures, and the frame permit transmission of forces between the vehicle frame and the axle housing without overstressing the weld seams interconnecting the mounting bracket and axle housing.

14 Claims, 3 Drawing Figures

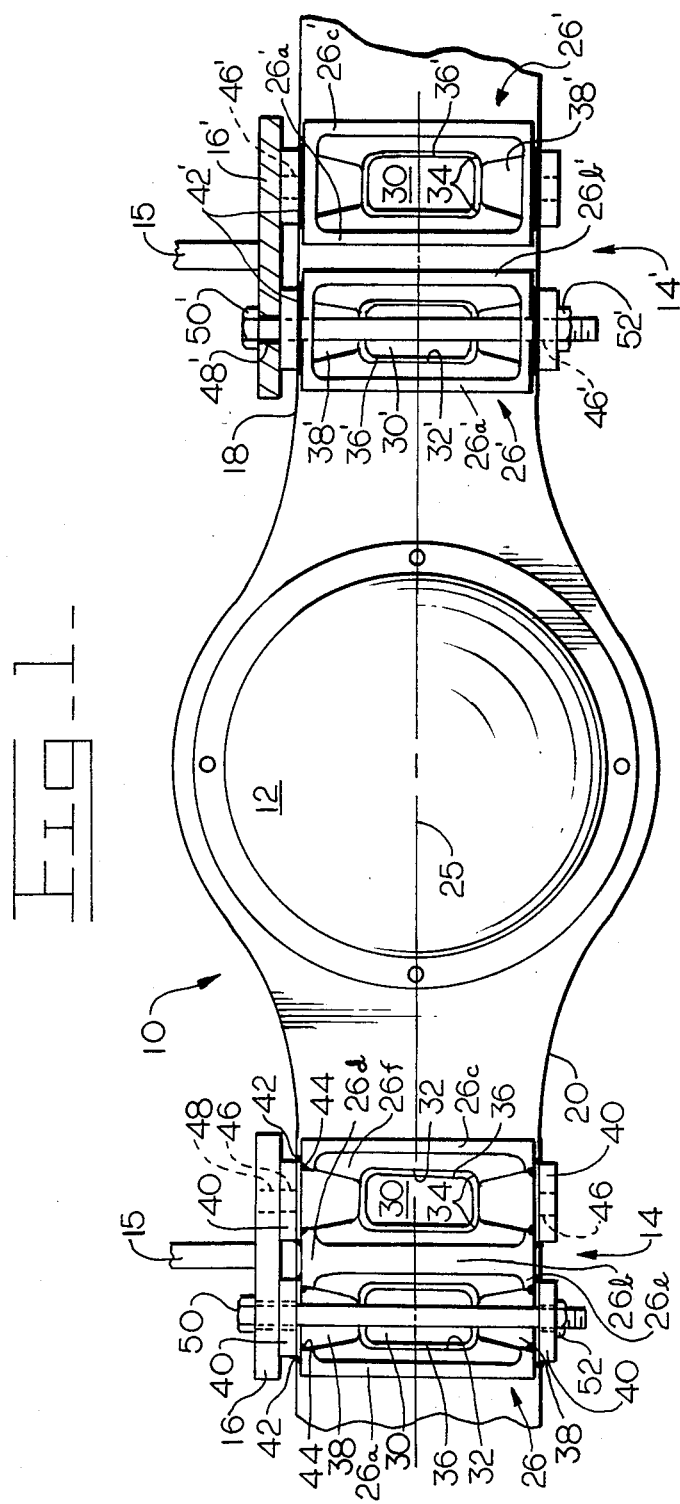

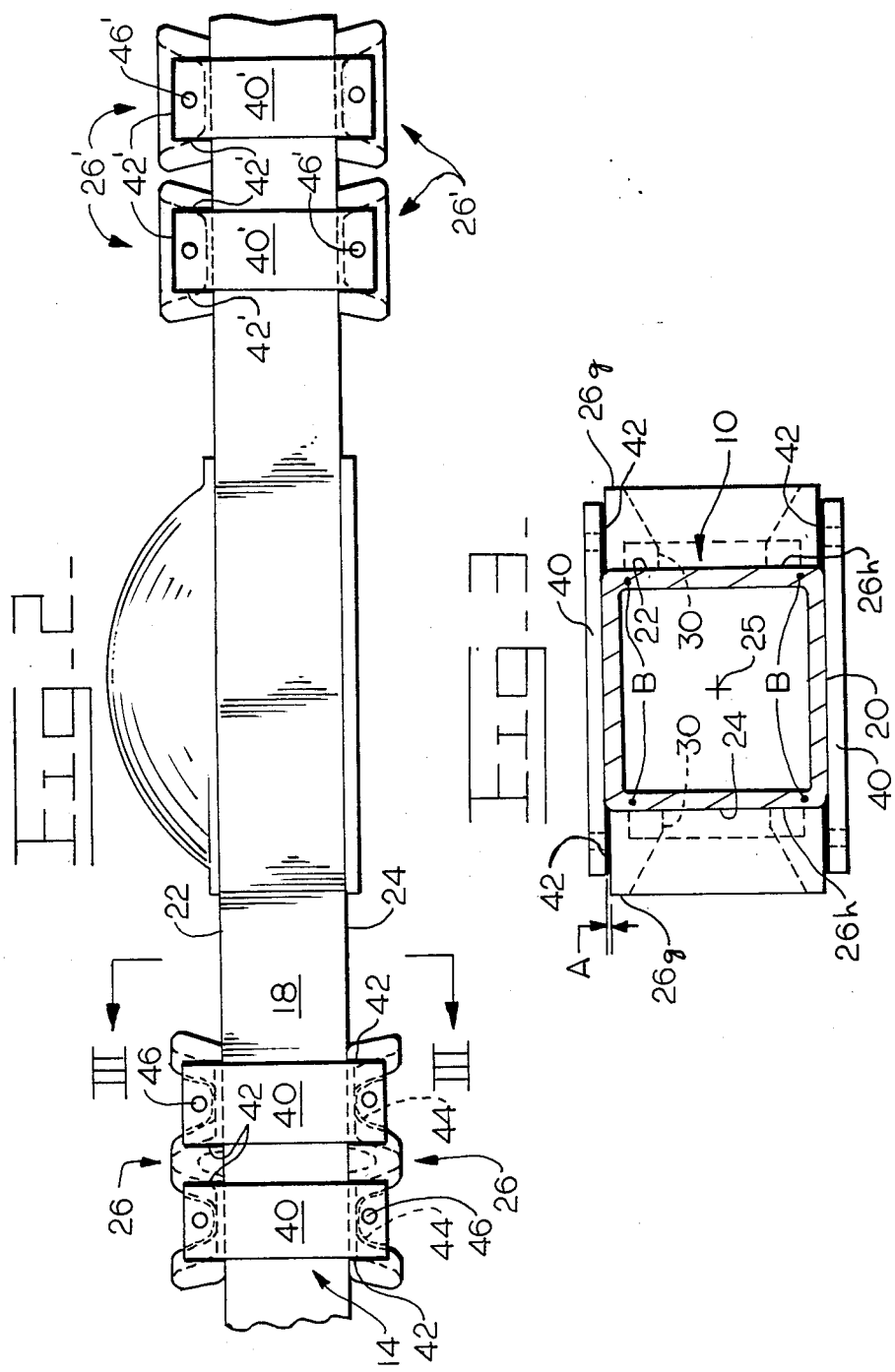

AXLE HOUSING MOUNTING BRACKET

TECHNICAL FIELD

This invention relates to axle housings, and more particularly, to axle housing mounting brackets which transmit loads from the vehicle frames to the axle housings.

BACKGROUND ART

Vehicle frames are often supported by axle housings that partially enclose axles on which wheels or other ground engaging members are mounted. Inertial forces exerted through the vehicle frames act on the axle housings in a first direction while the ground engaging members which are used to propel the vehicles exert reaction forces on the axle housings in a second, opposed direction. Of course, if the subject vehicle is pushing or drawing a load, the forces acting on the axle housing increase substantially beyond the inertial and reaction forces and must also be operationally accommodated by the axle housing.

Heavy-duty work vehicles have, in the past, typically used cast axle housings with the mounting brackets for connection to the frames being cast integrally with the axle housing. More recently, however, fabricated axle housings have come into wider use in certain applications, necessitating development of axle housing mounting brackets which can be attached to the fabricated axle housings to uniformly distribute forces between the vehicle's frame and axle housing.

One mounting bracket that has been successfully used includes an upper portion which is welded on the axle housing's neutral axis and a heavy, loose flat plate that is bolted to the bottom of the axle housing. Such loose, flat plate is massive and difficult to manipulate during its assembly. Preloads in bolts holding the frame to the mounting bracket are, in the aforementioned design, resisted by the housing. As such, substantial residual stresses are introduced into the housing which make it prone to buckling when external forces are introduced. Moreover, such design does not resist fore-aft motion in the lower half of the housing making is susceptible to weld failure.

A second known mounting bracket uses multiple vertical struts secured to the axle housing by vertical welds. The welds holding the struts to the housing, while located in the vicinity of the housing's neutral axis, each have a beginning and an end which act as stress risers making the weld susceptible to failure. Of course, when the attaching welds fail at an extreme point along their length, reduced weld areas transmitting the same force result in increased stress levels which, in turn, induce further failure in the remaining, intact welds. Through this mechanism, cracks in welds propagate over time. It has been determined that welding on the top and bottom of an axle housing is undesirable due to the extent of flexure at and the high stress levels experienced in the extreme fibers of the housing relative to its neutral axis. It has also been determined that welds which hold the mounting bracket to the axle housing and which are subjected to high stresses should be configured along a smooth arc or radius.

U.S. Pat. No. 4,134,507 discloses a flexing beam on which is mounted a bracket having an opening through it and a weld seam arranged around the periphery of the opening between the flexing beam and bracket about the beam's neutral axis. U.S. Pat. No. 1,293,872 illustrates two conduits joined together by abutment within a surrounding sleeve and subsequent welding through the sleeve to each of the attached conduit ends. While the aforementioned U.S. patents illustrate welding about the periphery of an opening, they do not relate to optimum disposition of the components of axle housing mounting brackets nor how or where the mounting brackets and axle housings are interconnected.

Accordingly, the present invention is intended to overcome the deficiencies of the known, aforementioned mounting brackets.

DISCLOSURE OF THE INVENTION

In accordance with the present invention, an improved mounting bracket is provided for connecting an axle housing to a frame. The invention generally includes a column structure engaged with and attached to a rearward and a forward side of the axle housing and a plate extending between and attached to adjacent ends of the column structures above and below the axle housing. Each column structure has an opening through which the axle housing's neutral axis is exposed. An endless weld seam about the periphery of the opening bonds each column structure to the associated side of the axle housing.

BRIEF DESCRIPTION OF THE DRAWINGS

The advantages of the present invention will become apparent from the following description when read in conjunction with the accompanying drawings in which:

FIG. 1 is a front elevation view of an axle housing on which are mounted alternate embodiments of an axle housing mounting bracket;

FIG. 2 is a plan view of the axle housing and mounting brackets illustrated in FIG. 1; and FIG. 3 is a side elevation view of FIG. 1.

BEST MODE FOR CARRYING OUT THE INVENTION

To establish a reference system for the drawings, the longitudinal and transverse directions will be understood to mean (with reference to FIG. 1) into the paper and along a horizontal line, respectively. Referring now to the drawings in detail, an axle housing 10 having a well known banjo-shaped differential cover 12 is illustrated in FIG. 1. Two alternate embodiments of axle housing mounting brackets 14 and 14' are illustratively mounted on opposite transverse sides of the differential cover 12 and are respectively attached to a vehicle 15 having frames 16 and 16'. While the mounting bracket embodiments 14,14' are illustrated on the same axle housing 10 and in engagement with different frames 16,16', it is to be understood that each vehicle 15 would normally have only one frame 16 or 16' and that two identical mounting brackets 14 or 14' would typically be utilized with the same axle housing 10. The primary considerations for selecting mounting brackets (14 or 14') for a particular application are the space on the utilizing vehicle's frame (16 or 16') available for attaching a mounting bracket and the separation distance between mounting holes in the frame. For small attachment spaces and narrowly spaced holes, bracket 14 is preferable. For larger attachment spaces or wider spaced holes, bracket 14' is preferable.

The axle housing 10 has a top wall 18, a bottom wall 20, a front side 22, a rear side 24, and a neutral axis 25 while the mounting bracket 14 has a column structure 26 assemblable to the front and rear sides 22 and 24. Each column structure 26 includes transversely separated column elements 26a, 26b, and 26c which are joined by an upper connection web 26d, a lower connection web 26e, and a body portion 26f. Since the column structures 26 which are joined to the front 22 and rear 24 sides of the axle housing 10 are identical, only one column structure 26 will be discussed. Each column structure 26 has an access face 26g and a housing engagement face 26h which are respectively distally and proximally located relative to each of the axle housing sides 22 and 24. An attachment opening 30 extends longitudinally through the body portion 26f of each column structure 26 at transverse positions between separate column elements 26a and 26b and between the column elements 26b and 26c. While each attachment opening 30 is illustrated in FIG. 1 as being vertically symmetrically arranged about the neutral axis 25 and horizontally symmetrically arranged between the column elements, it is to be understood that such symmetry is not required by the present invention. Each attachment opening 30 has a bounding wall 32 which includes arcuate corners 34 that preferably constitute smooth radii. A fillet weld seam 36 is deposited between each column structure 26 and one of the axle housing's sides 22 and 24 along the outline of the bounding wall 32. The column elements 26a, 26b, and 26c and the top and bottom connecting webs 26d and 26e taper from relatively thin sections to relatively thick sections in a direction from the access face 26g toward the engagement face 26h. Separate longitudinal cleaning indentations 38 above and below each attachment opening 30 in the body portion 26f and in the connecting webs 26d and 26e reduce the longitudinal thickness of such body portion 26f and connection webs midway between the column elements.

A stiffening plate 40 connected to the longitudinally adjacent column ends extends above and below the housing's top wall 18 and the housing's bottom wall 20, respectively. Each stiffening plate 40 is attached to the column structure 26 by an external weld joint 42 between the vertically outwardly facing surfaces relative to the neutral axis 25 of each connecting web and the transversely facing side surfaces of the stiffening plate 40 as well as by an internal weld joint 44 deposited between the side surfaces formed by the intersection of the cleaning indentations 38 and each connection web and the vertically inwardly facing surfaces of the stiffening plate 40. It is, of course, understood that the two stiffening plates 40 which are illustrated as being separately attached to the top and bottom of the column structures 26 could be replaced by a single large plate which is attached to the top and bottom of the same column structures 26.

It is to be noted that there are no weld seams between any stiffening plate 40 and the top or bottom axle housing wall 18 or 20, respectively. Vertical openings 46 in the plates 40 and a vertical opening 48 in the frame 16, when aligned, cooperatively receive a screwbolt 50. A nut 52 is threadably engaged with the screwbolt below the lower stiffening plate 40 and appropriately tightened to maintain constant engagement between the frame 16 and the upper stiffening plate 40.

Each column structure 26' includes two column elements 26a' and 26b' rather than the three column elements 26a, 26b, 26c of the column structure 26 and, of course, has only a single attachment opening 30'. The longitudinal indentations 38' for the column structures 26' terminate vertically at the vertically inwardly facing surfaces of the connection webs 26d' and 26e' and the stiffening plates 40' are longitudinally shorter than the combined longitudinal length of both column structures 26' and the axle housing 10 to provide additional exposure of the webs' vertically outwardly facing surfaces at the longitudinal ends of the stiffening plates 40'. There is no internal weld joint on the mounting bracket 14' corresponding to the weld joint 44, but the external weld joint 42' on the mounting bracket 14' also extends along each longitudinal end of the stiffening plates 40' to weldingly join those ends of the stiffening plates 40' to the additionally exposed vertically outwardly facing surfaces of the connection webs 26d' and 26e'. The column structures 26 and 26' otherwise have like components which are respectively indicated by unprimed and primed reference numerals.

INDUSTRIAL APPLICABILITY

The column structures 26 and 26' are slightly shorter than the vertical height of the axle housing's front and rear sides 22 and 24, respectively. Each column structure 26,26' is joined to the appropriate housing side (front 22 or rear 24) by centering the column structure vertically relative to the axle housing's neutral axis 25. The column structure's attachment fillet weld seam 36,36' is then applied to the column structure 26,26' and the axle housing 10 along a closed or endless path beginning at the neutral axis 25, proceeding continuously along the wall 32,32' bounding the opening 30,30' and ending at the neutral axis 25.

One stiffening plate 40 is then arranged above the longitudinally adjacent column structures 26 and axle housing top wall 18 and another plate 40 is arranged below the same column structures 26 and the axle housing's bottom wall 20. An external predetermined compression force is then applied directly to the plates 40 and indirectly to the top and bottom housing walls 18 and 20 to cause displacement thereof toward the neutral axis 25. The housing 10 is designed and manufactured to be vertically longer at its shortest point than are the columns 26,26' so as to result in a gap A remaining between each stiffening plate 40 and the vertically adjacent ends of the column structures 26,26'. The compression operation slightly deforms the axle housing 10 at its top and bottom walls 18 and 20, respectively, so as to eliminate any convexity in those walls and ensure contact between each plate 40 and the adjacent walls 18 and 20 in the regions B above and below the housing's side walls 22 and 24 (best seen in FIG. 3). Consequently, a portion of the frame-transmitted forces is transferred directly to the housing sides 22 and 24 which are reinforced against buckling by the columns 26,26' rather than transmitting the frame forces entirely through the column structures 26,26' to the housing's sides 22 and 24. Such dual path of force transmission drastically reduces the chance of housing failure in the "parallelogramming mode" where one pair of opposite corners in a rectangular cross sectioned housing approaches one another while the other pair of opposite corners moves away from one another.

While the compression force is maintained against the plates 40, at least one of the internal and external fillet weld seams 42 and 44 is applied to each plate 40 and the ends of the column structures 26,26' vertically adjacent thereto. While both internal and external weld seams 42 and 44 can be applied during the force application, it is usually more convenient to apply only one of the weld seams 42 or 44 prior to removing the compression force and its applicating (not shown) apparatus.

The maximum movement and highest stress of fibers in the axle housing 10 occurs in the upper and lower walls 18 and 20 which are situated at the maximum distance from the neutral axis 25. Consequently, any weld seams joined to such walls 18 and 20 will be maximally stressed and subjected to failure. Accordingly, none of the weld seams used in the mounting brackets 14 or 14' contact the upper or lower walls 18 or 20 of the axle housing 10 and the undesirable cyclic loading of such weld seams during dynamic operation of the axle housing 10 is avoided and fatigue life of the housing 10 is enhanced.

The holes 46 are subsequently drilled in aligned fashion through the upper and lower stiffening plates 40. Burrs and/or chips which result from drilling the holes 46 and which fall into the cleaning indentations 38,38' are easily removed from the column structure's access face 26g so as to facilitate subsequent insertion of the screwbolt 50. The axle housing 10 and joined mounting brackets 14,14' are then assembled to the vehicle frame 16,16' by inserting the screwbolts 50 through the aligned holes 46 and 48 and tighteningly advancing the nut 52 on each screwbolt 50.

Each axle housing mounting bracket 14,14' strengthens the axle housing 10 in the area of its attachment and uniformly distributes loads transmitted to it into the housing 10 to prevent buckling of the housing 10 in a "parallelogramming mode" when twisting forces and vertical loading are simultaneously applied to the mounting bracket 14,14'. The intimate contact between the top stiffening plate 40 and the regions B of the top wall 18 ensures transfer of a portion of the torque and vertical load directly to the sides 22 and 24 of the housing 10 rather than transferring all the load through the vertical column structures 26,26' to the front and rear sides 22 and 24 of the axle housing 10. The vertical column structures 26,26' rather than the axle housing 10 resist preload stressing of the screwbolts 50 which are suitably tightened during assembly to resist dislodgment.

It can be shown that use of the present invention's endless attachment weld seams 36 rather than weld seams having starting and ending points improves the fatigue life of the weld joint by approximately 300%. Moreover, by depositing the weld seams 36 within the "picture window" attachment openings 30 rather than in an external fashion where the weld is not transversely constrained, the attachment weld seams 36 at the rear side of the axle housing 10 in the lower, transversely outermost corners 34 are stressed in compression rather than tension so as to produce a theoretical improvement in the fatigue life of approximately 600%. It is also noted that the attachment weld seams 36 are, at all points, in close proximity to the neutral axis 25 and thus have a substantially longer fatigue life than weld seams which are on or near the axle housing's upper or lower walls 18 and 20, respectively.

It should now be apparent that an improved axle housing mounting bracket 14,14' has been provided in which the attachment weld seams 36 between the mounting bracket 14,14' and the associated axle housing 10 are on a smooth arcuate path or radius, that the top and bottom stiffening plates 40 are engaged with the axle housing 10 in the regions B of the top and bottom walls 18 and 20 but are only welded to the column structures 26,26', that bolt preloads which are applied during assembly of the axle housing 10 to the vehicle frame 16 are taken by the column structures 26,26', that the mounting bracket 14,14' has no massive parts which require manipulation at assembly time, and that the attachment weld seams 36 between the axle housing 10 and the mounting brackets 14,14' are endless rather than having starting and stopping points. Accordingly, the present invention axle housing mounting brackets 14,14' are easy to assemble, economical to build, and, most importantly, drastically improve reliability and availability of the supported vehicle.

We claim:

1. A mounting structure (14,14') for connecting an axle housing (10) having a neutral axis (25), top and bottom walls (18,20) and front and rear sides (22,24) to a supported frame (16), said mounting structure (14,14') comprising:
   longitudinally separated rigid column structures (26,26') respectively engaged with the front and rear walls (22,24) of the axle housing (10), each column structure (26,26') having a longitudinal opening (30,30') which is in overlapping relation with the neutral axis (25) and is completely bounded by a constraining wall (32);
   upper and lower plates (40,40') respectively engaged with the top and bottom walls (18,20) of the axle housing (10), said upper (40,40') and lower plates (40,40') being respectively joined to the longitudinally adjacent ends of said column structures (26,26'); and
   a weld seam (36,36') continuously disposed within each of said longitudinal openings (30,30') in joining relation with the column structure (26,26') and housing sides (22,24).

2. The mounting structure (14,14') of claim 1 wherein said constraining walls (32,32') have curved portions (34,34').

3. The mounting structure (14,14') of claim 1 further comprising:
   means (50,50') for connecting said upper (40,40') and lower (40,40') plates with the frame (16,16').

4. The mounting structure (14,14') of claim 3 wherein said upper (40,40') and second lower (40,40') plates have aligned vertical openings (46,46') on the front (22) and rear (24) sides of said axle housing (10); and
   said connecting means (50) comprising a screwbolt (50) receivable in said aligned openings (46,46') in the plates (40,40').

5. The mounting structure (14,14') of claim 4 wherein said vertical openings (46,46') intersect said longitudinal openings (30,30').

6. The mounting structure (14,14') of claim 1 wherein said column structures (26,26') have engagement faces (26h,26h') and access faces (26g,26g') which are respectively engageable with the sides (22,24) and are directed away from the sides (22,24), said constraining walls (32) converging in a longitudinal direction from the access face (26g,26g') toward said engagement face (26h,26h').

7. A method for mounting an axle housing (10) having a neutral axis (28) on a frame (16,16') comprising:
   welding a rigid column structure (26,26') to each side (22,24) of the axle housing (10), said welding being in a closed figure about the housing's neutral axis (25);
   fastening a plate (40,40') to the longitudinally adjacent ends of said column structures (26,26') in overlying and underlying engaged relation, respectively, with said axle housing walls (18,20); and fastening the plates (40,40') to the frame (16,16').

8. The method of claim 7 comprising: starting the column structure (26,26') to housing (10) welding at the neutral axis (25).

9. The method of claim 7 wherein said welding changes direction along smooth, continuous arcuate paths (34,34').

10. The method of claim 7 further comprising: pressing the plates (40,40') and axle walls (18,20) toward the neutral axis (25) with a predetermined force while maintaining a gap (A) between each plate (40,40') and the adjacent column ends.

11. A vehicle (15) comprising:
a frame (16,16');
an axle housing (10) disposed beneath said frame (16,16') in supporting relation therewith, said axle housing (10) having top (18) and bottom (20) walls and front (22) and rear (24) sides, said housing (10) also having a neutral axis (25); and
a mounting structure (14,14') for connecting the axle housing (10) to the frame (16,16'), said mounting structure (14,14') including
a pair of column structures (26,26') weldingly attached to the axle housing's front and rear sides (22,24), each of said column structures (26,26') having a bounded opening (30,30') through which said axle housing's neutral axis (25) is exposed;
a pair of plates (40,40') disposed in juxtaposed, contacting relation with the axle housing's top and bottom sides (18,20), each of said plates (40,40') being joined to the adjacent ends of said column structures (26,26');
a continuous weld seam (36) disposed in each bounded opening (30,30') in contact with the column structures (26,26') and the corresponding side of the axle housing (10), said weld seam (36) forming a closed figure; and
means (50,52) for fastening said frame (16,16') to said plates (40,40').

12. The vehicle (15) of claim 11 wherein said weld seam (36) has directional changes each of which constitute an arcuate path (34).

13. A mounting structure (14,14') for connecting a rigid member (16,16') to a horizontally disposed, flexible beam (10) having oppositely facing, longitudinally separated sides (22,24), oppositely facing, separated walls (18,20) interconnecting said sides (22,24), and a neutral axis (25), said mounting structure (14,14') comprising:
a pair of vertically separated plates (40,40'), each of which is engageable with one of the walls (18,20);
a pair of vertically oriented, longitudinally separated column structures (26,26') disposable adjacent the longitudinal sides (22,24), each column structure (26,26') including a longitudinal opening (30,30') overlappable with said neutral axis (25) and having an arcuately shaped wall (32,32') bounding said longitudinal opening (30,30'); and
means (50,52) for attaching said plates (40,40') to said frame (16,16').

14. A mounting structure (14,14') for a flexible beam (10) having upper (18) and lower (20) walls and front (22) and rear (24) sides interconnecting the walls (18,20), said mounting structure (14,14') comprising:
a pair of column structures (26,26') each of which has a body portion (26f,26f'), a pair of transversely separated column elements (26a,26b,26a',26b') joined to said body portion (26f,26f'), and a pair of vertically separated webs (26d,26e,26d',26e') each of which is joined to said body portion (26f,26f') and to said column elements (26a,26b,26a',26b'), said body portions being disposable adjacently said beam sides (22,24) and each having an attachment opening (30,30') therethrough;
a pair of stiffening plates (40,40') each of which is engageable with one of the beam walls (18,20) and is attached to said column structures (26,26'); and
an endless weld seam (36,36') disposed in each of said attachment openings (30,30') for joining said column structures (26,26') to the beam sides (22,24).

* * * * *